Aug. 26, 1924.

J. R. GRUETTER

DISCHARGE MECHANISM

Filed Sept. 30, 1922     5 Sheets-Sheet 3

1,506,632

Inventor
John R. Gruetter
By Gray and Lilly
Att'ys

Aug. 26, 1924.

J. R. GRUETTER

DISCHARGE MECHANISM

Filed Sept. 30, 1922   5 Sheets-Sheet 4

Inventor
John R. Gruetter
By Gray and Lilly
Att'ys

Aug. 26, 1924.

J. R. GRUETTER

DISCHARGE MECHANISM

Filed Sept. 30, 1922    5 Sheets-Sheet 5

1,506,632

Inventor
John R. Gruetter
By Gray and Lilly
Att'ys

Patented Aug. 26, 1924.

1,506,632

UNITED STATES PATENT OFFICE.

JOHN R. GRUETTER, OF CLEVELAND, OHIO.

DISCHARGE MECHANISM.

Application filed September 30, 1922. Serial No. 591,623.

*To all whom it may concern:*

Be it known that I, JOHN R. GRUETTER, a resident of the city of Cleveland, county of Cuyahoga, and State of Ohio, and a citizen of the United States, have invented certain new and useful Improvements in Discharge Mechanism, of which the following is a specification.

This invention relates to an improved discharge mechanism for bottles, the same being disclosed as embodied in a mechanism for cleaning bottles while they are carried on an endless conveyor, its special function being to deliver the bottles from said carrier to another conveying means such as a second conveyor, the latter traveling at right angles to the plane of the first and delivering the same to the point desired.

One object of the invention is to provide a discharge mechanism which is positively actuated, the bottle being directly moved by some element of the discharge at every step of its progress. Experience has shown that it is decidedly advantageous in mechanism of this type to keep the bottles under direct control throughout the cycle of their movement. Ignoring this principle leads to undue breakage and waste which it is the function of this mechanism to eliminate.

Another object of my invention is to provide discharge mechanism for bottles that will transfer the latter in a substantially upright position from the bottle holders of a traveling carrier to the traveling conveyor designed to receive them, and do so automatically.

A still further object of my invention is to make said transference by means of oscillating elements, thus reducing friction by eliminating sliding parts altogether.

These and other objects I attain in the following manner, reference being had to the accompanying drawings, in which:

Figure 2 is a view in elevation from the side opposite to that from which Fig. 1 is taken;

Figure 1:
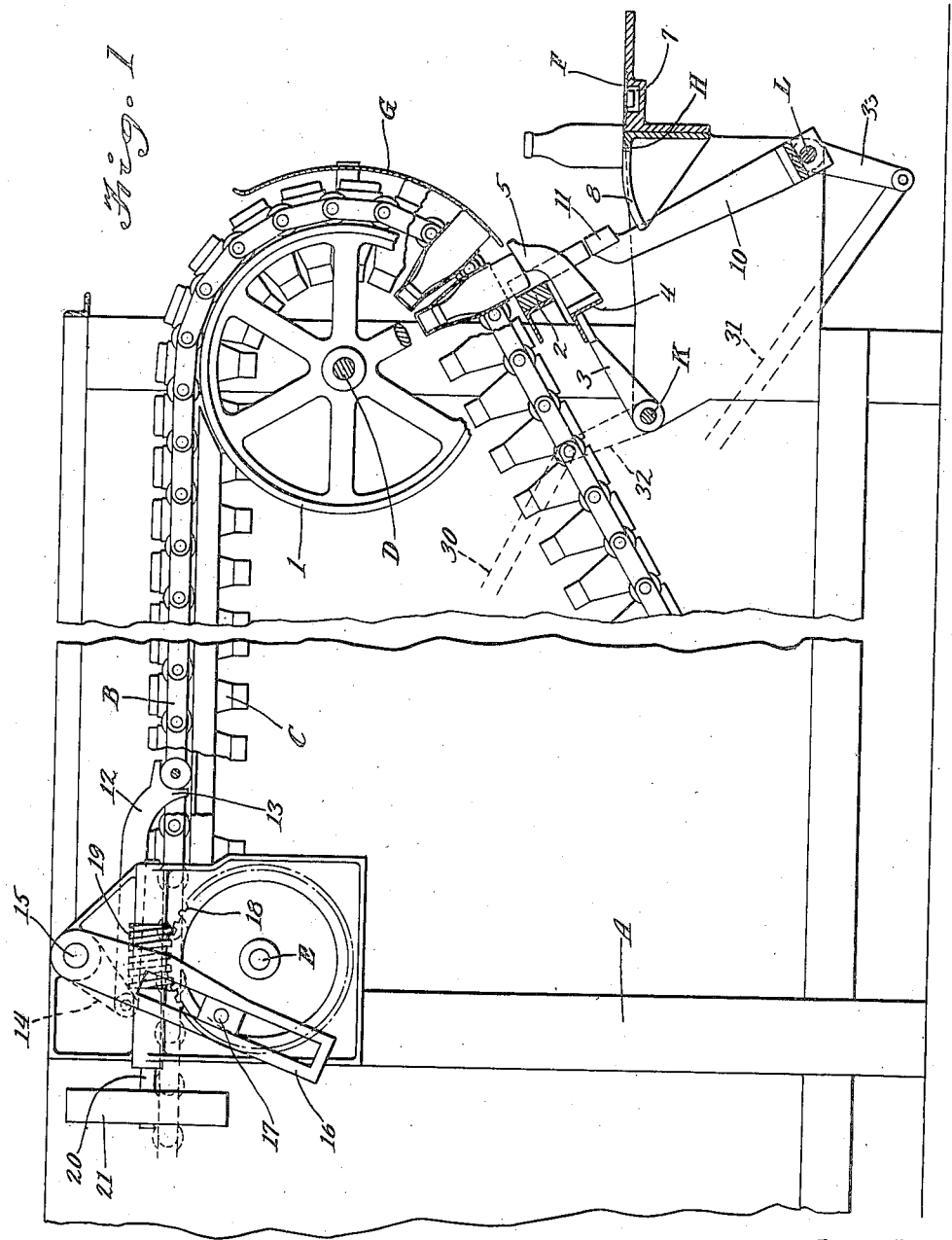
Figure 1 is a side view of the discharge mechanism together with certain actuating means, parts being shown in section.

In the drawings, A indicates the frame generally, B the travelling carrier for bottles including therewith bottle holders or chucks C for receiving the bottle necks therein which normally maintain them on the upper run of the carrier, but permit their release at the discharge point of the machine where the bottles are suspended from such carrier chucks and drop therefrom when no obstacle prevents. This carrier is often used as an instrument for moving bottles during a cleansing operation, but it is by no means to be understood that my discharge mechanism is limited to such use as my invention is designed and intended for all sorts of machines having a carrier from which bottles are to be discharged, especially the type in which the bottles are to be transferred to another conveyor.

In the machine here disclosed, D designates a conveyor pulley shaft, E a shaft for certain actuating mechanism, and F the conveyor for receiving the bottles from the transfer mechanism and conveying the bottles to another point which may be a fixed depository or another machine, such as a filling machine. The bottles are shown travelling in the direction indicated by the arrow, and finally arriving at the discharge end where gravity exerts its force to release them; and a stationary guard G is provided to prevent their premature discharge. H designates a stationary support upon which the bottles are positioned prior to pushing them onto the second conveyor. This support is also a fixed frame part, serving the additional purpose of mounting the conveyor F in appropriate position. The latter is arranged in a plane at right angles to that of the carrier B and is mounted on pulleys I for continuous movement.

Below the shaft D there are mounted at suitable points two actuating shafts K and L whose functions will be explained in due course.

Figure 3:
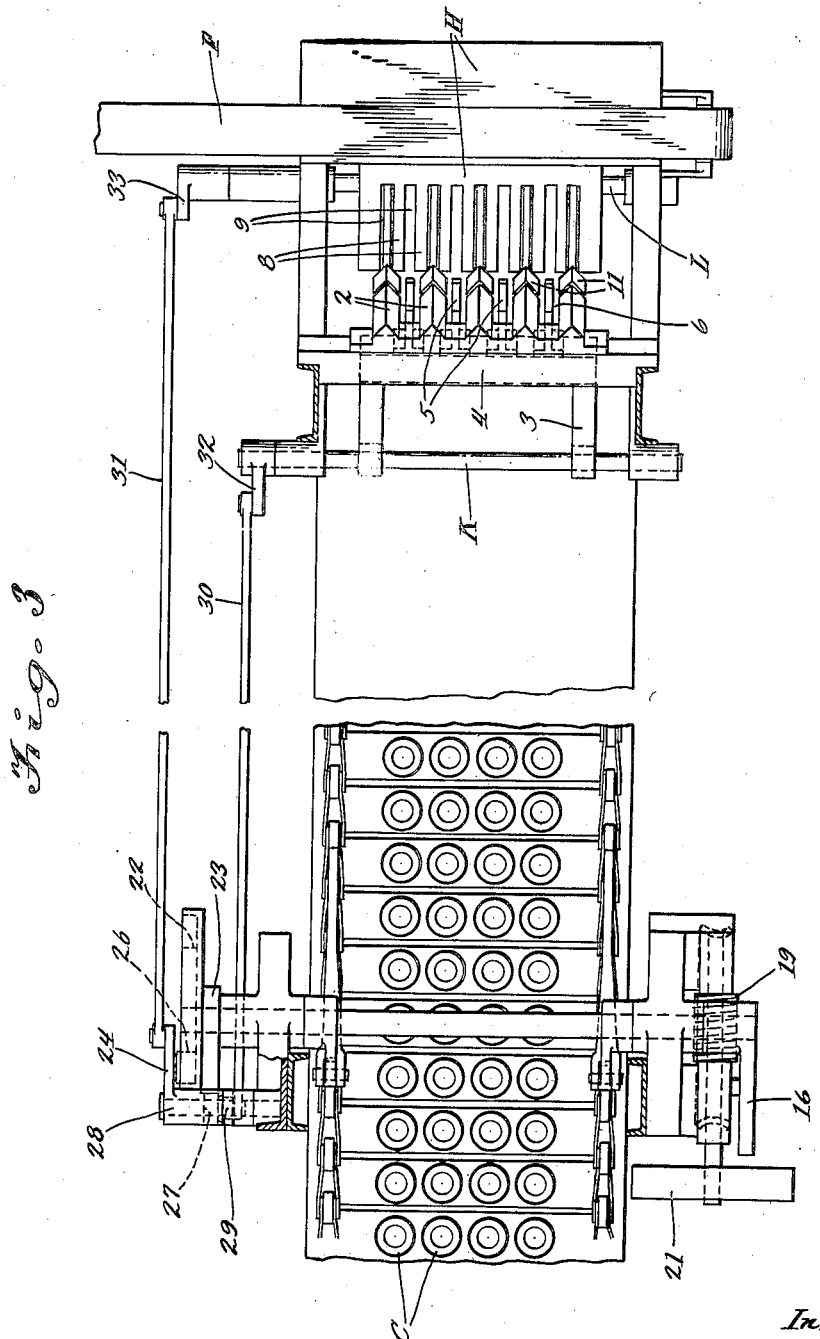
Figure 3 is a plan view, parts being broken away.
Figure 4:
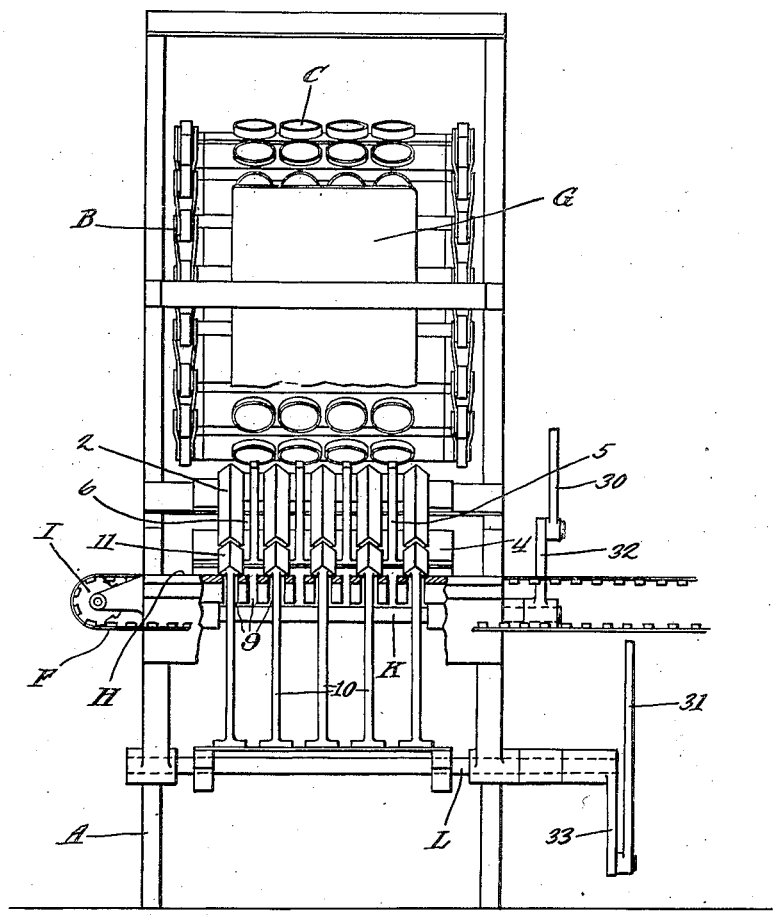
Figure 4 is an end elevation of the machine taken from the front.

It is to be understood that the holders C are arranged in rows or banks as shown in Figures 3 and 4, these rows extending transversely of the carrier B while the bottles are travelling thereon; and the guard G restrains the bottles from falling from the chucks C until they pass below the lower end of the said guard G, as the chain carrier B with bottles thereon rides over the conveyor pulley 1. Below the end of the guard, are fixed by suitable attachment to the machine frame a plurality of supporting blocks 2 which are V-shaped in cross section and positioned perpendicularly to the tangent of the carrier curve. These blocks are arranged in rows corresponding to the rows of chucks on the carrier B and are in spaced relation so that each pair forms a trough to receive therebetween a bottle and permit the same to slide down the trough when other transferring agencies permit. See Fig. 4, more especially. When, therefore, the number of bottles in a row, as here illustrated, is four, the number of blocks will be five so that four trough-shaped receiving supports will be formed. In any case, the number of such guide blocks 2 will be one more than the number of bottle chucks in the transverse rows on the carrier B.

Figure 5:
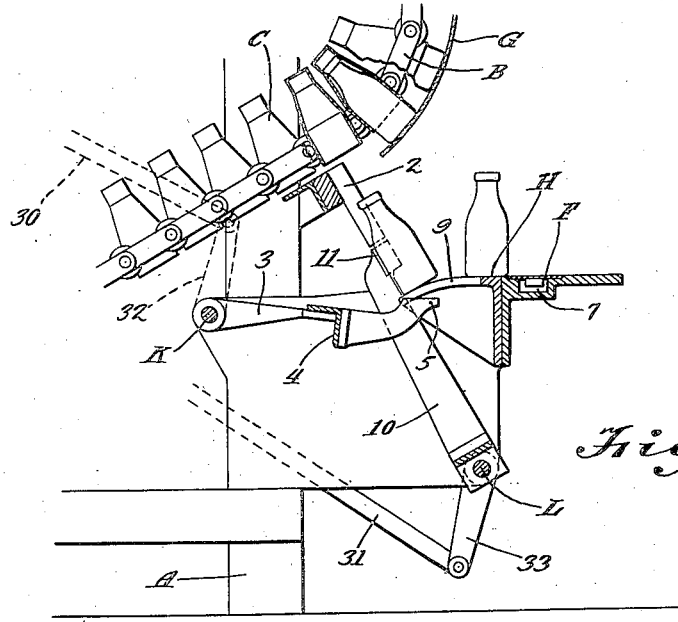
Figures 5 and 6 are side views, partly in section and partly in elevation, of the discharge elements and a small section of the carrier, the two views showing the parts in different relation in the course of discharging the bottles.
Figure 6:
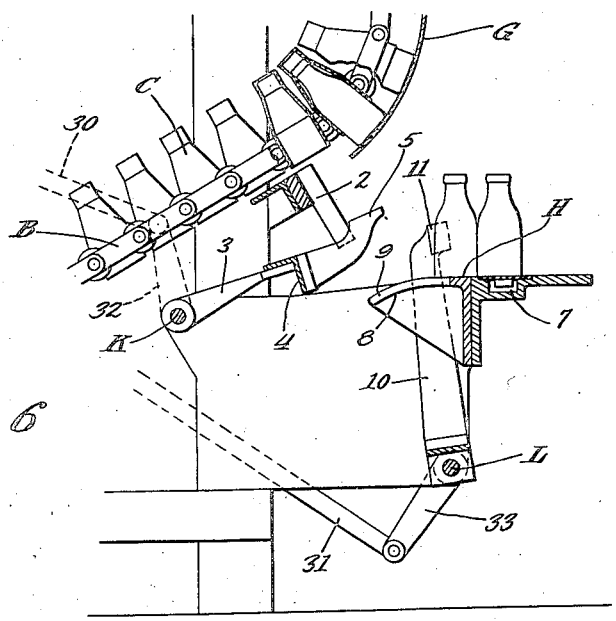

Fixed to the shaft K and movable with it are a number of lever arms 3 which move in a small arc about their pivot or fulcrum K so as to be in an approximately horizontal plane, the lower point of the outer ends of the arms being shown in Fig 5, while the highest position is shown in Fig. 1. To these outer ends of the arms 3, which are usually two in number, is attached a common supporting base member 4 in a plane transverse to the carrier B, and from this base extends in turn supporting arms 5 which are flat pieces or strips easily movable in a vertical plane in slots 6 between the blocks 2. As the bottles pass beyond the guard G, the bottles drop into the inclined troughs formed by pairs of stationary blocks 2, but they cannot descend for an appreciable distance without control because the heads of the arms 5 are then raised to their upper position, by actuation means to be later explained, and receive the bottoms of the bottles thereon and descend gradually in the slots 6 to lower position from the angle in Fig 1 to that in Fig. 5. Each swing of the parts 3, 4 and 5 transfers a row of bottles from their holders C on the carrier to the stationary support H. The latter is a sort of table having a groove transverse of the plane of the carrier and designated 7 within which the conveyor F travels. The edge of the support H nearest the carrier B is formed of a plurality of tonges or blades 8 separated by longitudinal slots 9 within which levers may reciprocate as will be later explained. These blades 8 extend directly toward the carrier B but are curved downwardly as shown in Figures 1, 5 and 6. These blades are separated sufficiently to receive the supports 5 therebetween, but not as large as the diameter of the bottle. When therefore the supports 5 drop from their position shown in Figure 1 to their lowest point they will leave the bottles on these curved blades 8 and descend further to the position shown in Figure 5. During the controlled falling of the bottle, it or they are guided by the blocks 2 above described, and remain so guided in the inclined position which the bottles take on the curved blades when the supports 5 no longer touch them.

It is to be assumed that the table H has four portions, the curved portion formed by the said blades, the portion which is horizontal and covered by the width of the conveyor F, an outer leaf extending beyond the said conveyor, and a substantially horizontal portion of a width corresponding to the diameter of a bottle and extending between the conveyor and the curved portion. The latter portion is occupied by the bottles which are arranged in alignment parallel with the conveyor when they are first pushed by actuating means now to be described. See Fig. 1. These bottles then remain in that position until the next row is pushed over from the curved blades in contact with this first set and then are in turn pushed onto the conveyor.

The means which I provide for moving the bottles from the position shown in Fig. 5 to that shown in Fig. 6 consists of a plurality of arms 10 carried upon the shaft L, the said arms having heads 11 which correspond in transverse section to the blocks 2, the slender portion of the arms 10 travelling between the blades 8 in the slot 9, each bottle resting in a sort of trough formed by a pair of said heads 11. It is evident therefore that five such arms and heads will be required for moving a tier of four bottles.

The travel of the carrier B is operated intermittently by a pair of rods 12 having toes 13 at their outer ends which drop down between the links of the carrier chains and push the latter forward the length of one link at each stroke, its contour being such that the toe easily rides over the link pivots slipping back in position to grasp another link. The said rods are actuated by arms 14 extending from an oscillating shaft 15, the latter being in turn actuated by an arm 16 driven by a pin 17 on a pulley fixed to the shaft E. The latter shaft is in turn actuated by a gear 18 mounted on said shaft which gear is driven by a worm 19 on a shaft 20 which is actuated by a belt pulley 21 or gear as may be found most expedient.

The shaft E has also mounted thereon two cams 22 and 23 which drive levers 24 and 25 pivoted on alined fulcrums 28 and 29 by rollers 26 and 27, respectively. Through the intermediacy of links 30 and 31 the levers 25 and 24 actuate the arms 32 and 33 respectively, the former serving to rock the shaft K, and the latter the shaft L. The rocking of the shaft L oscillates the arms 10 for pushing the bottles into upright position ready for being crowded over upon the conveyor belt, and the oscillation of the shaft K oscillates the arms 3 for moving the control supports 5 to deposit the bottles descending from the holders C onto the blades 8.

Figure 2:
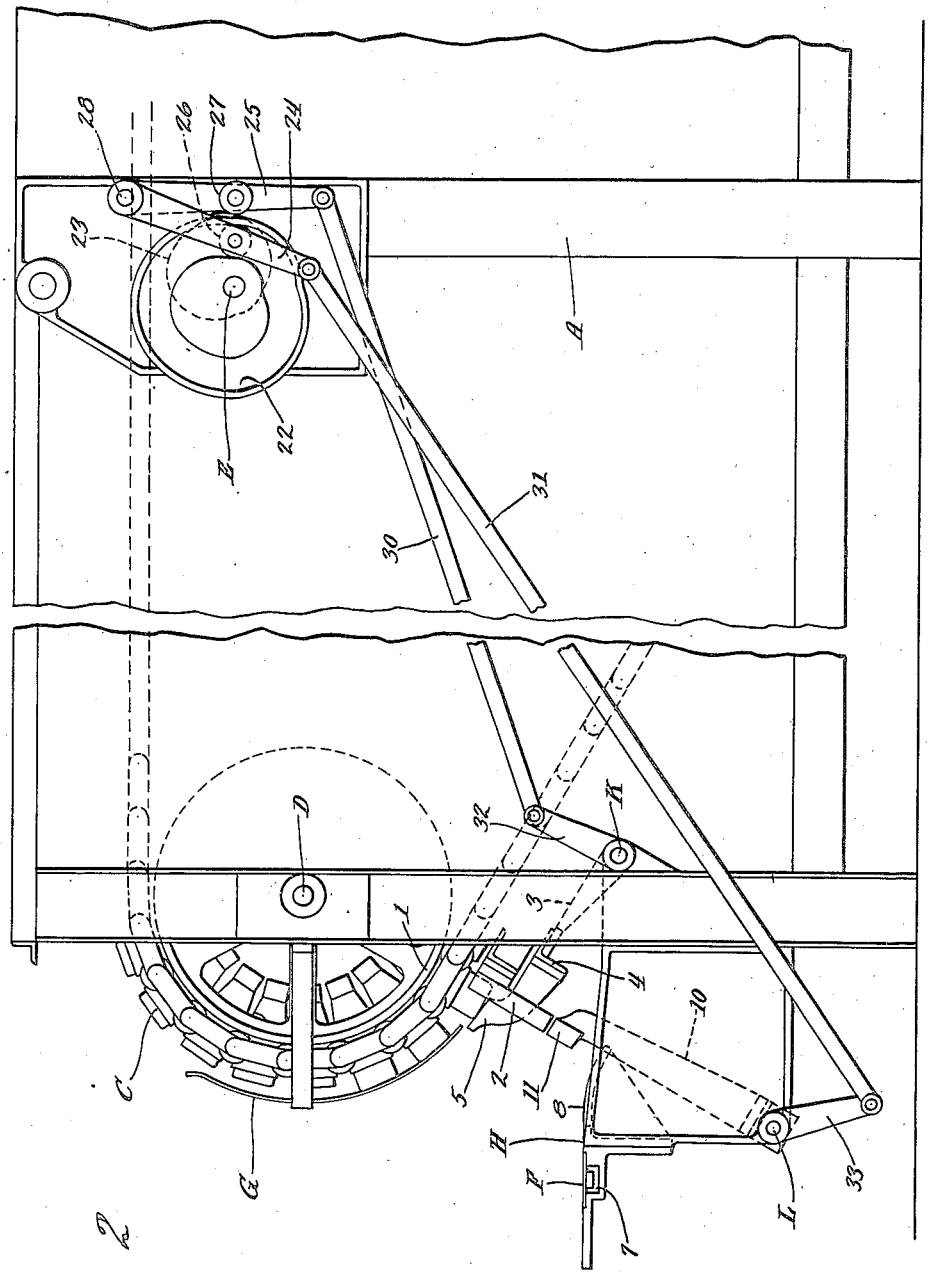

From the above description of parts the operation of my improved mechanism will be clear. A résumé of the joint action of the various elements will, however, be recited: The bottle carrier B and conveyor F operate intermittently, the forward movement of the conveyor F is continuous in the direction shown by the arrow in Fig. 4. In Fig. 1 of the drawing the forward movement of the actuating rod 12 is about to begin, while the holders or supports 5 have just received a row of bottles from the carrier chucks C and have begun the down movement to deposit the bottles on the curved blades 8 of the table H, and the row previously thrust over to a position adjacent the conveyor F is in position to receive a further thrust to the right, as shown in said view, for loading the same on the conveyor. The bottles loaded on said conveyor by the last cycle of operations have been carried by the latter out of view, and the said conveyor is about to receive the next row. Fig. 2 represents the parts in the same relative position as in Fig. 1. In Fig. 5 the supports or stops 5 have deposited a row of bottles on the curved blades, and the arms 10 are about to contact this row by the heads 11 to push it forward. In Fig. 6 the supports 5 upon arms 3 are rising to receive the next row of bottles when they have passed the lower end of the guard G, and the heads 11 are in contact with the last row of bottles and has completed its thrust so that one row is resting on the conveyor which is about to begin its forward movement. The arms 10 are about to drop back in time to permit the arms 5 to drop the next row of bottles in front of the heads 11.

As soon as the supports 5 reach the lowermost position just below the upper surface of the blades 8, the cam groove begins to thrust roller 26 outward, to thereby advance the heads 11 forward, after which they will recede. This completes the cycle.

It is thus seen that the sliding movement of the bottles on the blocks 2 is positively controlled by the supports 5, and that this control continues until the heads 11 are in direct contact with them at their sides while their bases rest on the curved blades 8, so that every stage of their travel is accurately controlled by my automatic mechanism here disclosed. The complete description of the operation of the parts may not be fully understood without emphasizing the fact that the slots 9 of the support H are used as follows: The arms 10 oscillate in alternate slots, as shown in Figs. 3 and 4. For this reason, when a bank of four bottle chucks is used on the carrier B, four supports or stops 5 and slots 6 are provided, but five guide blocks 2 and five arms 10. This makes necessary nine slots between the curved blades 8, because the slots 9 for receiving the stops 5 are arranged to alternate with those for receiving the arms 10. This construction arises from the fact that two blocks 2 and two heads or guides 11 are needed for their function, while but one stop 5 is needed for controlling a bottle. While the operation here shown is for handling bottles in rows, it is to be understood that I may contemplate using my invention for discharging bottles from carriers on which they are carried either singly or in groups, as well. Indeed, the machine as here shown may operate upon bottles singly, if it is so desired. If the machine were especially adapted for handling bottles singly the supports 2 would consist of but one pair having a single trough therebetween, there would be but one pair of blades 8 and of levers 10, and but one stop 5 and arm 3. But one bottle would then be loaded on the conveyor at a time.

It is also expressly to be understood that I am by no means restricted to the mechanism shown for actuating the carrier B, but that such general structure, not claimed per se, is to be taken as merely illustrative as other intermittent actuation would be likely to serve as well. Nor do I desire to restrict myself to the exact type of carrier B and chuck C here shown. Any carrier that will hold the bottles inverted on its upper run and release them when they arrive beyond the guard G or other restricting means may serve as the mechanism from which my discharge device may operate.

No means for actuating the conveyor F is disclosed in this case, as such mechanism is more or less conventional, and is accordingly neither shown nor claimed per se.

Having described my invention, what I claim, and desire to secure by Letters Patent, is—

1. In a discharge mechanism for bottles, the combination of a support having a fork-shaped edge providing a slot between said forks smaller in cross section than the bottom of a bottle, and means reciprocating toward and from said forks, and including a portion small enough to enter said slot for depositing a bottle on said edge and over said slot.

2. In a discharge mechanism for bottles, a stationary, inclined, slotted guide member whose walls on either side of the slot are arranged to form a trough-shaped rest for a bottle, and a swinging member movable in and lengthwise of said slot and provided at its end with a stop for receiving the bottom of a bottle thereon as the latter slides down the guide.

3. In a discharge mechanism for bottles, the combination of a stationary, inclined, slotted guide member whose walls on either side of the slot are arranged to form a trough-shaped rest for a bottle, a support adjacent the lower end of the guide member, a swinging member movable in and lengthwise of said slot and provided at its end with a stop for receiving the bottom of a bottle thereon, and means for swinging the movable member to deliver the bottle on said support.

4. In a discharge mechanism for bottles, a stationary, inclined, slotted guide member whose walls on either side of the slot are arranged to form a trough-shaped rest for a bottle and a swinging member movable in said slot and provided at its end with a stop for receiving the bottom of a bottle resting in the trough, in combination with an oscillating expulsion member movable in the same plane as the said side walls but at the lower end of the latter.

5. In a discharge mechanism for bottles, the combination of a stationary, inclined, slotted bottle guide member, a support member movable in said slot for supporting a bottle thereon while guided by the guide member in a slightly inclined position, a pair of fork members having a slot therebetween of sufficient width to receive therein the movable support member but not the bottle, and means for swinging the support member toward and from a point below the upper surface of the said fork members.

6. In a discharge mechanism for bottles, the combination of a stationary slotted guide, a bottle supporting member movable in the slot, a support slotted to form parallel blades for receiving bottles thereon, the latter being of sufficient width to receive the bottle supporting member therein but not a bottle, mechanism for expelling a bottle from said blades while the bottle supporting members are therebeneath, and means for moving the supporting member upwardly while the expelling mechanism is advanced.

7. In a discharge mechanism for bottles, the combination of a bottle support for receiving the bottom of a bottle thereon, a pair of stationary fork members having a slot therebetween of sufficient width to receive therethrough the said support but not the bottle, means for swinging the said support upwardly and downwardly, the latter movement terminating just below the upper surface of the said fork members, and means for expelling the bottle from the said support when the latter is in its lowest position.

8. In a discharge mechanism for bottles, an inclined, slotted, stationary guide, a swinging member movable in said slot for controlling the movement of a bottle resting thereon, a support adjacent said swinging member and having a slot therein in the same vertical plane as the guide slot, said support slot being of sufficient width to receive said member therein but not the bottle, thrust mechanism for pushing a bottle from the said swinging member when the latter is in the down position, and means for actuating the said swinging member.

9. In a discharging mechanism for bottles, the combination of a bottle support having a stop at one end for receiving the bottom of a bottle thereon, a stationary support having a slotted edge whose slot is of sufficient width to receive therethrough the stop but not the bottle, means for moving the bottle support toward and from the said slot, the former movement terminating below the upper surface of the stationary support, and means for pushing the bottle away from said slotted edge while the stop is in its lowest position.

10. In a discharge mechanism for bottles, a support for receiving bottles thereon in a substantially upright position and having open slots at one edge thereof, a stationary slotted, inclined guide and a swinging stop member movable in said guide slot for holding a bottle thereon, the said support slots being of a width sufficient to receive the stop but not the bottle, and oscillating push members movable in planes parallel with the plane of movement of the stop member and between said blades when the stop member is in the down position, and means for actuating the latter when the push members are in their withdrawn position.

11. In an unloader for bottles, a bottle carrier mechanism, a bottle conveyor mounted for travel in a plane at an angle to that of said carrier, a support adjacent the said conveyor, a fixed guide member comprising spaced, inclined blocks extending from a point adjacent the said carrier to the surface of said support, the inner edge of the latter being divided into separate blades, a slot between the blades as well as a slot between the blocks being in the same plane and registering with a chuck in the carrier, a control member movable in the slots between the blocks and the blades from a point near the chuck to a point below the blades for receiving a bottle thereon as it drops from the chuck and depositing the same on the blades, oscillating members movable through the slots between the blades in a direction transverse to the said conveyor, and means for actuating the control member and oscillating members.

12. In an unloader for bottles, an endless carrier including chucks for receiving therein the necks of bottles, a bottle conveyor mounted for travel in a plane at right angles to that of the said carrier, a support adjacent the said conveyor, a series of stationary, inclined, vertical blocks spaced apart providing narrow guide slots therebetween in register with the said chucks on the carrier, a plurality of stop members mounted for movement in an arc extending from said chucks to a point a little below the surface of said support, each moving in the same plane as said guide slots, said support having spaced blades on the side nearest the carrier, means movable between the said blades for pushing bottles seated thereon transversely of said conveyor and parallel with said blades, and means for actuating said movable means while the stop members are in their lower positions and for moving the stop members upward toward and from the said chucks while the bottle moving members are in their withdrawn position.

13. In a discharge mechanism for bottles, a support having a row of slots in one edge thereof, a series of inclined guide members spaced apart but not sufficiently to receive bottles therebetween, a swinging member comprising a series of arms having stops at their outer ends movable in the spaces between the guide members for supporting the bottoms of bottles thereon, and the said support slots being of such width as to receive the stops but not the bottles therein, a series of swinging thrust members adapted to enter said support slots, means for actuating the swinging member when the thrust members are withdrawn from the last-mentioned slots, and means for actuating the thrust members when the stops are just beneath the edge of the said support.

14. In a discharge mechanism for bottles, the combination with two conveyor mechanisms movable in intersecting planes, of a support adjacent one of such conveyors and below one end of the other, inclined guide members spaced apart but not sufficiently to receive a bottle therebetween, an oscillating arm carrying at its outer end a plurality of stops of such width as to be receivable between said guide members, said support having a series of transverse slots on its inner edge that are of sufficient width to receive the said stops therebetween but not the bottles, a series of thrust members reciprocating through the said transverse slots to push the bottles from the said guide members toward the adjacent conveyor when the stops are positioned below the upper surface of the said support in the slots of the latter, means for actuating the said arm to move the stops to and from the said support, and means for actuating the thrust members when the stops are in the down position.

15. In a discharge mechanism for bottles, a support for bottles and having a row of blades on one edge with transverse slots therebetween, a series of guide members spaced apart to form slots narrower than the diameter of a bottle and inclined from the vertical but leading downward toward the said support edge, the guide slots being in alinement with alternate support slots and the latter being narrower than the diameter of a bottle, a series of stop members movable through both sets of slots and having their outer ends adapted to receive thereon the bottoms of bottles, a horizontal shaft extending beneath and transverse of said blades, a series of arms mounted on said shaft for movement through said support slots and having heads V-shaped in cross section on their outer ends, said heads working in pairs to form trough-shaped thrust members for moving the bottles in rows transversely of the support and being in alinement with the said guide members when in their withdrawn position, means for actuating the stop members when the thrust members are in their advanced position, and means for actuating said shaft when the stops are in the down position.

16. In a discharge mechanism for bottles, a support having a slotted edge forming a series of projecting blades, a series of spaced guides V-shaped in cross outline and whose slots are narrower than the diameter of a bottle, said guides being fixed and serving in pairs to form troughs that are inclined from the vertical to permit bottles to slide down the incline and said guide slots being in alinement with the slots in the support, a series of stops movable in both sets of slots, a horizontal shaft to the rear of said guides, said stops being mounted on said shaft for oscillation, a series of thrust members movable from a position where they are in alinement with said fixed guides forward transverse of the said support and into the support slots, the said thrust members having heads having a cross section similar to that of the said guides, means for actuating the said oscillating shaft to lower the said stops with bottles supported thereon when the thrust members are in their withdrawn position, and means for actuating the thrust members.

17. In a discharge mechanism for bottles, a support having at one edge a series of spaced, downwardly bent projections providing slots therebetween smaller than the bottom of a bottle in cross section, fixed, slotted guides inclined from the vertical and perpendicular to the outer ends of said projections, means for controlling the movement of a bottle down said guides and means including a portion small enough to enter one of said support slots for pushing a bottle from its inclined position on the farther end of the projections forward transversely of the support to a vertical position on the upper surface of the latter.

18. In a discharge mechanism for bottles, the combination of a flat support having at one edge thereof a series of downwardly bent projections having slots therebetween narrower than the diameter of the bottom of a bottle, fixed slotted guides inclined from the vertical and perpendicular to the outer ends of the projections, and means movable within either set of slots for depositing a bottle on said downwardly bent projections and over the slots therebetween.

19. In a discharge mechanism for bottles, the combination of a stationary, inclined, slotted guide member whose walls on either side of the slot are arranged to form a trough-shaped rest for a bottle, a support having at one edge a downwardly bent portion adjacent the lower end of the guide member, a swinging member movable in said slot and provided at its end with a stop for receiving the bottom of a bottle thereon, and means for swinging the movable member to deliver the bottle on said bent portion.

20. In a discharge mechanism for bottles, the combination of a stationary, inclined, slotted bottle guide member, a support member movable in said slot for supporting a bottle thereon while guided by the guide member, a pair of fork members in a plane substantially perpendicular to said inclined guide member and having a slot therebetween of sufficient width to receive therein the support member but not the bottle, and means for swinging the movable support member toward and from a point below the upper surface of said fork members.

21. In a discharge mechanism for bottles, an inclined, slotted, stationary guide, a swinging member movable in said slot for controlling the downward movement of a bottle in said guide, a support having at one edge a pair of downwardly bent fork members, the outer ends of the latter being in a plane substantially perpendicular to said inclined guide, said fork members having a slot therebetween of sufficient width to receive therein the said swinging member but not the bottle, mechanism for moving a bottle from said fork members up onto the main body of the support when the swinging member rests within the slot between said fork members, and means for moving the swinging member upwardly while the bottle moving means is advanced.

22. In a discharge mechanism for bottles, a slotted guide, a swinging member movable in said slot for supporting the bottom of a bottle thereon, a support adjacent said swinging member and having a downwardly bent edge with a slot therein of sufficient width to receive the swinging member therein but not the bottle, thrust mechanism for pushing a bottle from the said edge over onto the main body of the support while the swinging member is in the down position, and means for actuating the swinging member.

23. In a discharge mechanism for bottles, the combination of a bottle controlling mechanism including a stop for receiving the bottom of a bottle thereon, a support having a downwardly bent edge with a slot therein of sufficient width to receive the said stop therein but not the bottle, means for reciprocating the stop upwardly and downwardly, the latter movement terminating below the upper surface of said bent edge, and means for pushing a bottle from said edge over onto the main portion of the support when the stop is in its lowest position.

24. In a discharge mechanism for bottles, the combination of a bottle guiding mechanism including means for supporting a bottle thereon while guided in a slightly inclined position, a support having a downwardly bent edge, there being a slot in said edge of sufficient width to receive therein the said bottle supporting means but not the bottle, and means for swinging the said supporting means toward and from a point below the upper surface of said edge.

25. In a discharge mechanism for bottles, a pair of V-shaped members, one side portion of each member forming together a trough element having a slot therein, a reciprocating member movable in said slot for supporting thereon the bottom of a bottle resting in the trough, in combination with expulsion members movable from a point in alinement with said V-shaped members forward above the lower position of said reciprocating member.

26. In a discharge mechanism for bottles, a pair of spaced guide members, side portions of each forming together a trough element with a slot therein, a support having a downwardly curved edge adjacent the guide members and having slots therein, one being in alinement with the slot in the trough element, and means movable in said trough slot for supporting thereon the bottom of a bottle, in combination with a pair of swinging members mounted concentric with said edge curve and movable in slots in said edge from points in alinement with said guide members forward transverse of said support to expel the bottle from said curved edge.

27. In a discharge mechanism for bottles, a support having on one edge a pair of downwardly curved projections and a slot therein, means for supporting a bottle in position vertical to the outer ends of said projections and over said slot, a pair of swinging members mounted pivotally concentric with said edge curve and movable transversely of said support for expelling a bottle from said curved edge and seating it in a vertical position on the main part of said support, and means for actuating said swinging members.

28. In a discharge mechanism for bottles, a series of spaced guide members arranged in pairs, side portions of each pair forming together a trough element with a slot therein, a support having a downwardly curved edge adjacent the guide members and having a series of slots therein, certain of said edge slots being in alinement with the trough slots, means movable in said trough slots and the alined edge slots for supporting thereon the bottoms of bottles resting in the troughs, in combination with a series of swinging members arranged in pairs and pivotally mounted concentric with said curved edge for movement in edge slots alining with the guide members, and means for swinging said members transversely of said support to expel the bottles from their position on the outer ends of said edge and seating them in a vertical position on the main portion of the support.

29. In a discharge mechanism for bottles, a pair of V-shaped members, one side portion of each member forming together a slotted trough element in combination with a reciprocating member movable in said slot for supporting thereon the bottom of a bottle resting in the trough to control its movement therein.

In testimony whereof I hereunto affix my signature.

JOHN R. GRUETTER.